Patented Sept. 24, 1946

2,408,329

UNITED STATES PATENT OFFICE 2,408,329

ALKYATION PROCESS

Jacob R. Meadow, Lexington, Ky., assignor to Socony-Vacuum Oil Company, Incorporated, a corporation of New York No Drawing. Original application October 9, 1943, Serial No. 505,661. Divided and this application May 23, 1945, Serial No. 595,492

5 Claims. (Cl. 260—683.4)

This invention relates to the alkylation of paraffinic hydrocarbons with olefinic hydrocarbons, and is more particularly concerned with the catalytic alkylation of isoparaffinic hydrocarbons with olefinic hydrocarbons in the presence of hydrofluoric acid.

It is well known in the art to effect the union of paraffinic hydrocarbons and olefinic hydrocarbons by processes broadly called alkylation processes. In alkylation processes, a charge including a mixture of a paraffinic hydrocarbon called the paraffinic reactant, and an olefinic hydrocarbon called the olefinic reactant, is introduced into a reaction zone under suitable reaction conditions of temperature and pressure, referred to as alkylating conditions, to yield a product called the hydrocarbon alkylate, which comprises constituents of a saturated character. Since the alkylating conditions cause also polymerization of the olefinic reactant, it is necessary to maintain a relatively low concentration of the olefinic reactant in the charge. Generally speaking, the more severe the alkylating conditions, i. e. the higher the temperatures and pressures, the higher the yield of hydrocarbon alkylate. The only limit to the pressure used appears to be the feasibility of maintaining high pressures. On the other hand, the temperature used is limited by the degradation of the hyqdrocarbon reactants in the charge to low molecular weight hydrocarbons, and the occurrence of secondary reactions, including polymerization of the olefinic reactant, under high temperature conditions, that substantially reduce the purity of the product obtained.

Alkylation may be conducted at high temperatures and pressures, on the order of over 900° F. and over 4000 pounds per square inch, respectively; or may be carried out at lower temperatures and pressures, in the presence of substances that facilitate the union of paraffinic hydrocarbons and olefinic hydrocarbons, hence called alkylation catalysts, thereby assuring a high yield of desired hydrocarbon alkylate by avoiding extensive degradation of the reactants, the occurrence of secondary reactions, and appreciable polymerization of the olefinic reactants. The two methods are known as thermal alkylation and as catalytic alkylation, respectively.

Several methods are known for the catalytic alkylation of paraffinic hydrocarbons with olefinic hydrocarbons. Thus, it is known to carry out the alkylation of paraffinic hydrocarbons with olefinic hydrocarbons in the presence of alkylation catalysts consisting essentially of metal and non-metal halides, such as aluminum chloride, boron trifluoride and the like, of sulfuric acid, of phosphoric acid, of metal phosphates, of activated clays, and the like. In these processes, the alkylation catalysts are used in amounts varying between about 10% and 200% by weight, on the charge, depending upon the alkylation catalyst and conditions used. However, it would seem that these and similar alkylation catalysts have one or more definite disadvantages, among which the most important are promotion of the aforementioned secondary reactions and loss of alkylation catalytic activity on the part of the catalyst, relatively rapidly. Notably, the metal halides form additional compounds with olefinic reactants, that ultimately degenerate into tarry masses that represent loss of catalytic activity of the alkylation catalysts and loss of potential olefinic reactant. Similarly, sulfuric acid causes the formation of various organic compounds that ultimately reduce the catalytic activity of the acid necessitating periodic removal of the sulfuric acid contaminated with these compounds, and replacement with fresh acid. It must be noted further, that sulfuric acid is a powerful oxidizing agent and its use, at temperatures above about 125° F., entails extensive undesirable secondary reactions that consume the acid and the valuable hydrocarbon reactants.

Concentrated hydrofluoric acid, when used as an alkylation catalyst, apparently does not have these disadvantages. It is a non-oxidizing and non-reducing substance and hence, it may be used at elevated temperatures without any of the undesirable results referred to hereinbefore. Several processes are known in the art for catalytically alkylating paraffinic hydrocarbons with olefinic hydrocarbons in the presence of hydrofluoric acid. Generally speaking, the process is carried out with the hydrocarbon reactants substantially in liquid phase and in the presence of sufficient amounts of hydrofluoric acid to effect substantial saturation of the hydrocarbon liquid with hydrogen fluoride.

In some instances, the alkylation catalyst consists of two or more of the alkylation catalysts referred to. Thus, it is known to effect the alkylation of paraffinic hydrocarbons with olefinic hydrocarbons in the presence of alkylation catalysts consisting of mixtures of sulfuric acid and hydrofluoric acid, or of mixtures of sulfuric acid and hydrochloric or hydrobromic acids, or of mixtures of a metal halide and the corresponding hydrogen halide.

It is also known that certain substances called promoters, promote the catalytic action of alkylation catalysts, particularly those consisting essentially of metal halides. Accordingly, several processes have been proposed wherein small amounts of these promoters, on the order of about 0.5 to 3% by weight, on the charge, are added to the alkylation catalysts to promote their alkylation catalytic activity.

I have now found that the alkylation catalytic activity of anhydrous hydrogen fluoride may be appreciably enhanced through the addition of organic or inorganic halogen compounds, excluding fluorides, or of elemental halogens, excluding fluorine.

It is an object of the present invention to provide an efficient process for catalytically alkylating paraffinic hydrocarbons with olefinic hydrocarbons. Another object of the present invention is to provide an efficient process for catalytically alkylating paraffinic hydrocarbons with olefinic hydrocarbons in the presence of hydrofluoric acid. A more specific object is to provide a process for catalytically alkylating paraffinic hydrocarbons with olefinic hydrocarbons to produce high yields of high-octane blending agents for the manufacture of improved motor fuels. A very important object of the present invention is to afford a process capable of carrying out the above objects by carrying out the reaction in the presence of halogens, other than fluorine, or of halogen compounds, other than fluorides. Other objects and advantages of the present invention will become apparent to those skilled in the art from the following description.

Broadly stated, the present invention provides a process for alkylating paraffinic hydrocarbons with olefinic hydrocarbons, which comprises contacting a paraffinic hydrocarbon and an olefinic hydrocarbon in a reaction zone under alkylating conditions, with an alkylation catalyst consisting essentially of anhydrous hydrogen fluoride, in the presence of organic or inorganic halogen compounds, excluding fluorides, or of elemental halogens, excluding fluorine.

While it is well known that hydrofluoric acid is a good alkylation catalyst, see U. S. Patent No. 2,267,730, my invention indicates very definitely that halogen compounds, other than fluorides and elemental halogens, other than fluorine, improve the quality and quantity of the hydrocarbon alkylate, when these compounds or elemental halogens are added to the hydrogen fluoride, before the alkylation operation is carried out.

When a mixture of a paraffinic hydrocarbon, particularly a low-boiling isoparaffinic hydrocarbon such as isobutane, anhydrous or concentrated hydrofluoric acid, and an olenfinic hydrocarbon such as isobutylene, is maintained at a reduction temperature, a union takes place between the paraffinic hydrocarbon and the olefinic hydrocarbon to produce a higher boiling paraffinic hydrocarbon which generally represents structurally, the addition of the original hydrocarbon reactants. Valuable high-octane blending agents for the manufacturing of improved motor fuels may be thus produced. For example,

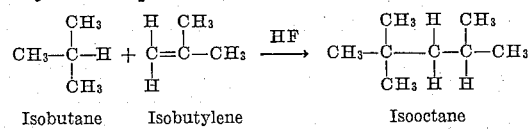

Isobutane   Isobutylene                  Isooctane

In carrying out the alkylation of paraffinic hydrocarbons with olefinic hydrocarbons in the presence of hydrofluoric acid as alkylation catalyst, the hydrofluoric acid should be used in amounts of at least about 10% and up to about 60% of the total charge, on a liquid volume basis. Aqueous solutions of hydrofluoric acid in which hydrogen fluoride is present in concentrations greater than 80% may be used, but the use of 95% to 100% hydrofluoric acid is to be preferred, and substantially anhydrous hydrofluoric acid or hydrogen fluoride is very effective as an alkylation catalyst in the process of my invention.

The reaction temperature may be varied over a wide range depending upon the paraffinic reactant used in the reaction. Generally speaking the temperature of reaction varies between about 0° F. and about 400° F., lower temperatures being used when the more reactive paraffinic or olefinic reactants are employed and higher temperatures becoming necessary when the less reactive paraffinic or olefinic reactants are employed. For instance, when the paraffinic reactant is isobutane or isopentane, and when the olefinic reactant is propylene or butylene, alkylation may be readily effected at temperatures varying between about 35° F. and about 100° F.

Ordinarily, alkylation in the presence of hydrofluoric acid as the alklation catalyst, is carried out under super atmospheric pressure, and pressures varying between about 20 pounds per square inch and 500 pounds per square inch have been found ample in most instances. As a general rule, the most suitable pressure is more or less dependent upon the particular temperature involved and when high temperatures are employed, pressures as high as 2000 pounds per square inch may be employed, if desired.

In carrying out alkylation of paraffinic hydrobons with olefinic hydrocarbons, it is well known, as stated hereinbefore, to maintain a relatively low concentration of the olefinic reactant in the reaction zone, in order to preclude extensive polymerization of the olefinic hydrocarbon. Accordingly, it is advisable to maintain the olefinic hydrocarbon concentration in the reaction zone below about 25% by volume, and preferably, between about 7% and about 12% by volume. In continuous operation, this is effected by introducing the olefinic reactant over a period of time corresponding to the reaction period.

The reaction period during which the olefinic reactant is introduced into the reaction zone to react with the paraffinic reactant to produce the hydrocarbon alkylate, depends upon the temperature, and to a certain extent, upon the pressure. Ordinarily, a reaction period varying between 15 minutes and 2 hours is satisfactory. At higher temperatures, the time of reaction may be as low as 5 minutes and even lower, while at lower temperatures, the time of reaction may be as high as 5 hours.

It must be understood, that the reaction variables are more or less interdependent, hence when one is arbitrarily fixed, the limits within which the others may be varied, are somewhat restricted. In any particular instance, the most desirable conditions can be readily ascertained by one skilled in the art, the preferred ranges of these variables having been indicated hereinbefore.

The paraffinic and olefinic hydrocarbons to be used in my process may be derived from any suitable source, as is well known in the art, and may be used either in the pure state or in admixture with other constituents not undesirable. The paraffinic and olefinic hydrocarbons usually employed in the preferred operation of manufacturing motor fuels will be the normally gaseous paraffinic hydrocarbons, except methane and ethane, and the normally gaseous olefinic hydrocarbons, propylene, butylene and pentene, as is well understood in the art. A conventional and preferred source of paraffinic and olefinic hydrocarbons is the fixed gases obtained around petroleum refineries. These fixed gases may furnish substantially all the desired paraffinic and olefinic hydrocarbons, or it may be necessary or desirable to obtain additional supplies, as is well understood. Additional olefinic hydrocarbons, if required, may be formed from a portion of the paraffinic hydrocarbons. On the other hand, additional amounts of paraffinic hydrocarbons may be admixed in order to increase the concentration of paraffinic hydrocarbons to a desired magnitude.

5% and about 50% with respect to the amount of hydrogen fluoride employed. Larger amounts appear to be unnecessary; however, it must be noted that they may be employed if desired, although no additional advantages result therefrom. The amounts of hydrogen fluoride additives used may be smaller, on the order of 1% to about 5%, when larger amounts of hydrogen fluoride catalyst are employed.

Numerous experimental data could be adduced to indicate the results obtainable by employing the hydrogen fluoride additives of the present invention in the catalytic alkylation of paraffinic hydrocarbons with olefinic hydrocarbons in the presence of hydrogen fluoride, but the following examples are sufficiently characteristic:

|  | Run 1 | Run 2 | Run 3 | Run 4 |
|---|---|---|---|---|
| Isobutane, weight in grams | 261 | 270 | 265 | 275. |
| Isobutylene, weight in grams | 87 | 87 | 87 | 87. |
| Hydrogen fluoride, weight in grams | 35 | 35 | 35 | 35. |
| Hydrogen fluoride additive, weight in grams | None | HCl₃ | T-butyl-chloride 10 | T-butyl-bromide 18. |
| Temperature, °C | 25–30 | 25–30 | 25–30 | 25–30. |
| Pressure in pounds per square inch | 40–80 | 40–80 | 40–80 | 40–80. |
| Hydrocarbon alkylate, weight in grams | 152 | 176 | 196 | 201. |
| Total octanes 90° C.–125° C., weight in grams | 91 | 102 | 112.5 | 118.5. |
| Isooctane 98° C.–101° C., weight in grams | 39 | 47 | 54 | 59. |

The organic and inorganic halides, other than fluorides, and the elemental halogens, other than fluorine, that are used in accordance with the process of my invention, may be solids, liquids or gases under normal conditions. It is suspected that the improved results obtained with those substances, is probably due more to an ultimate activation of the olefinic reactant during the alkylation operation, than to promoter action on the hydrogen fluoride catalyst, although the latter should not be excluded altogether. Whatever the function of these substances is, the quality and quantity of the hydrocarbon alkylate are substantially improved through their use. In view of the relative uncertainty of the manner in which these substances function during the alkylation operation, these substances may be referred to more correctly, as hydrogen fluoride additives, rather than as promoters or as activators.

The hydrogen fluoride additives of my invention include various metallic chlorides, bromides and iodides, for example, anhydrous calcium chloride; organic halogen compounds, excepting fluorides, such as alkyl chlorides, bromides and iodides, especially secondary and tertiary halides; aralkyl halogen compounds, excepting fluorides; aliphatic and aromatic acid chlorides, bromides and iodides; non-metallic halides, excepting fluorides, such as phosphorus and sulfur chlorides, bromides and iodides; hydrogen halides, excepting of course hydrofluoric acid; and finally, the halogens themselves, excepting fluorine.

I especially prefer to use, as hydrogen fluoride additives, alkyl chlorides and bromides, particularly tertiary alkyl chlorides and bromides and secondary alkyl chlorides and bromides, hydrogen halides other than hydrofluoric acid, and halogens other than fluorine. Specific and preferred hydrogen fluoride additives that may be mentioned by way of non-limiting examples are: tertiary butyl chloride, tertiary butyl bromide, tertiary amyl chloride, tertiary amyl bromide, isopropyl chloride, isopropyl bromide, propylene chloride, propylene bromide, hydrogen chloride, hydrogen bromide, chlorine and bromine.

The amounts of hydrogen fluoride additives ordinarily used in my process, vary between about The octane fraction of the hydrocarbon alkylate produced by my process contains 2,2,4-trimethylpentane in predominant amounts, and the results of infra-red analysis indicate the presence also of 2,3,3-trimethylpentane. This octane is not present in the hydrocarbon alkylates obtained when the alkylation is conducted in the absence of my hydrogen fluoride additives and under the conditions outlined hereinbefore. Infra-red analyses also indicate that the hydrocarbon alkylates obtained when alkylation is carried out in the absence of the hydrogen fluoride additives of my invention and under conditions outlined in the preceding table, contain appreciable concentrations of unsaturates which are not present in the hydrocarbon alkylates obtained in the process of my invention.

The present application is a division of copending application Serial Number 505,661, filed October 9, 1943.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

I claim:

1. In a process for alkylating a paraffinic hydrocarbon having at least three carbon atoms with an olefinic hydrocarbon having at least three carbon atoms, which includes contacting said paraffinic hydrocarbon with said olefinic hydrocarbon in a reaction zone under alkylating conditions, in the presence of a hydrogen fluoride alkylation catalyst, and maintaining said paraffinic hydrocarbon in excess over said olefinic hydrocarbon in said reaction zone so that alkylation is the principal reaction; the improvement which comprises contacting said paraffinic hydrocarbon and said olefinic hydrocarbon with a hydrogen fluoride alkylation catalyst in said reaction zone, in the presence of a material selected from the group consisting of chlorine, bromine, and iodine.

2. The process of manufacturing high-octane gasoline, which comprises contacting a normally gaseous isoparaffinic hydrocarbon and a normally gaseous olefinic hydrocarbon having at least three carbon atoms in a reaction zone under alkylating conditions, with a hydrogen fluoride alkylation catalyst, in the presence of chlorine, and maintaining said normally gaseous isoparaffinic hydrocarbon in excess over said normally gaseous olefinic hydrocarbon in said reaction zone so that alkylation is the principal reaction.

3. The process of manufacturing high-octane gasoline, which comprises contacting a normally gaseous isoparaffinic hydrocarbon and a normally gaseous olefinic hydrocarbon having at least three carbon atoms in a reaction zone under alkylating conditions, with a hydrogen fluoride alkylation catalyst, in the presence of bromine, and maintaining said normally gaseous isoparaffinic hydrocarbon in excess over said normally gaseous olefinic hydrocarbon in said reaction zone so that alkylation is the principal reaction.

4. The process of manufacturing high-octane gasoline, which comprises contacting isobutane and isobutylene, in a reaction zone under alkylating conditions, with a hydrogen fluoride alkylation catalyst, in the presence of chlorine, and maintaining said isobutane in excess over said isobutylene in said reaction zone, so that alkylation is the principal reaction.

5. The process of manufacturing high-octane gasoline, which comprises contacting isobutane and isobutylene, in a reaction zone under alkylating conditions, with a hydrogen fluoride alkylation catalyst, in the presence of bromine, and maintaining said isobutane in excess over said isobutylene in said reaction zone, so that alkylation is the principal reaction.

JACOB R. MEADOW.